United States Patent [19]

Doumas et al.

[11] 4,198,296
[45] Apr. 15, 1980

[54] PROCESS AND APPARATUS FOR TREATING DRINKING WATER

[75] Inventors: John J. Doumas, Wilton, Conn.; Alan H. Molof, New City, N.Y.; Gordon H. Raymond, Southington, Conn.; Lee Wikstrom, Pomona, N.Y.

[73] Assignee: Consolidated Foods Corporation, Old Greenwich, Conn.

[21] Appl. No.: 922,935

[22] Filed: Jul. 10, 1978

Related U.S. Application Data

[63] Continuation-in-part of Ser. No. 806,637, Jun. 15, 1977, which is a continuation-in-part of Ser. No. 572,758, Apr. 29, 1975, abandoned.

[51] Int. Cl.² .................................................. B01D 15/04
[52] U.S. Cl. .......................................... 210/29; 210/32; 210/37 R; 210/64; 210/501
[58] Field of Search .............. 210/501, 29, 32, 37 R, 210/63 R, 63 Z, 64, 198 R, 209, 259

[56] References Cited

U.S. PATENT DOCUMENTS

| 2,391,258 | 12/1945 | Meincke | 210/28 |
|---|---|---|---|
| 2,445,669 | 7/1948 | Goetz | 210/28 |
| 2,595,290 | 5/1952 | Quinn | 210/37 X |
| 3,359,743 | 9/1967 | Bealle | 210/24 X |
| 3,585,130 | 6/1971 | Gregory | 210/266 |
| 3,872,013 | 3/1975 | Nishino et al. | 210/501 X |

OTHER PUBLICATIONS

"Potable Water Bactericide Agent Devel," Final Report, 6–12, (1971), Contract NAS 9–12104.

Primary Examiner—Charles N. Hart
Assistant Examiner—E. Rollins Cross
Attorney, Agent, or Firm—William S. Henry

[57] ABSTRACT

This invention relates to the discovery that chemicals existing in natural waters, which have been pretreated in municipal water treatment facilities, as well as natural surface and underground waters which have not been so pretreated, do inhibit the biocidal effect of known water disinfectants of the metallic ion type. This may be overcome by exchanging for the halide ions in such water an anion, such as bicarbonates, which does not inhibit the biocidal effect of metallic ions, nor does it react chemically with known oxidizing biocides to form halogenated organics which are suspected of causing cancer. Further, water treated in accordance with this invention substantially maintains its original ionic character to maintain the water in a natural state, for example, not deionized.

In accordance with another aspect of the invention, water which has been municipally treated with oxidizing biocides and may contain halogenated organics is pretreated to remove the halogenated organics prior to the removal of halides referred to above.

20 Claims, 11 Drawing Figures

PROCESS AND APPARATUS FOR TREATING DRINKING WATER

This application is a continuation-in-part of our co-pending application Ser. No. 806,637 filed June 15, 1977, which in turn is a continuation-in-part of our application Ser. No. 572,758 filed Apr. 29, 1975, now abandoned.

SUMMARY OF THE INVENTION

A process and apparatus for producing biologically safe and palatable drinking water in which water may be preconditioned by removal of suspended solids and further subjected to removal of halide ions and then subjected to treatment with a disinfectant or combination of disinfectants capable of exercising suitable biocidal and virucidal action. This may be followed by steps and the utilization of apparatus to reduce below the legal limit for potable water the disinfectant or combination of disinfectants. The disinfectant may be supplied by a compound capable of releasing silver ions; for example, the silver may be applied by contacting the water with a media of activated charcoal having silver salts and metallic silver absorbed and impregnated thereon. Oxidizing disinfectants may be applied as solutions or soluble solids either alone or in sequence with silver ions. Objectionable amounts of the disinfectant may be reduced to the amount below the legal limit for potable water by passing the treated water through an activated charcoal media which is sanitized against bacterial growth or through ion exchange resins similarly sanitized or through a combination of both.

The present invention involves use of silver ions in the absence of chloride as a purifying agent. The use as purifying agents of other metallic ions, such as mercury ions or oxidizing disinfectants is also facilitated by the prior elimination of halide ions.

BACKGROUND OF THE INVENTION

Treatment of household drinking water by passing the water through a bed of activated charcoal impregnated with or having oligodynamic silver or other bactericide adsorbed thereon is known from the prior art. For example, U.S. Pat. No. 2,595,290, patented May 6, 1952, U.S. Pat. No. 3,242,073 patented Mar. 22, 1966, U.S. Pat. No. 3,268,444, patented Aug. 27, 1968, U.S. Pat. No. 3,585,130, patented June 15, 1971, and the references cited therein.

In addition to the above cited patented prior art, the United States National Aeronautics and Space Administration (NASA) has conducted experiments (see first paragraph below) and constructed apparatus for treating spacecraft water with silver ions for biocidal and virucidal purposes (see second and third paragraphs below).

The first NASA reference is entitled "Biocidal Effects of Silver, Contract NAS 9-9300. Final Technical Report, February 1971. Dean O. Cliver, Ph.D, University of Wisconsin." This study reports on the biocidal virucidal effects of silver ions in a very pure distilled or deionized water, and the bacteria involved are not pathogens as found in natural water. This study indicated that increased silver ion levels reduce kill time and the inhibitory effect of chlorides is mentioned. However, there is nothing in this report regarding techniques for introducing silver ions into natural water utilizing silver salt and silver metal adsorbed and impregnated in activated charcoal to obtain high silver release at seasonal customary water temperatures in accordance with the present invention.

A second NASA reference is entitled "Potable Water Bactericide Agent Development. Contract NAS 9-912104. Final Report 3097, July 1972; Chemtric Inc."

The report deals with the development of a silver ion purification system designed to treat "worstcase" water produced as a by-product of fuel cells to be used in the Orbiter program. A specific water analysis was involved. For various reasons, a specific sequence of units was established.

A. Biological Filter containing AgCl particles.

Filter was designed to remove particulates and biological contaminants that would otherwise rapidly clog the ensuing system.

B. Activated Carbon Filter.

A plain activated charcoal filter was used to remove add taste, odors, colors, and other impurities not removed by the Biological filter.

C. Silver Chloride Column.

A column composed of crystals of silver chloride interspersed among glass beads was used to dose the water with silver ions. At natural concentrations of $1.35 \times 10^{-3}$ g/l, the silver ion content would be far in excess of that reported by Cliver.

D. Water Storage Tank.

A pair of water storage tanks was next in the series. No apparent reasons were given for location of the tanks at this point in the sequence. Obviously, the supply flow rate of approximately one gallon per hour required an intermediate storage point in order to deliver product water at approximately 7 gallons per hour. It is worth noting that two tanks (of unstated size) were used—connected in parallel, rather than in series. Further, however, the system could bypass the tanks entirely, thus implying a lack of concern with holding time to allow complete biocidal effect.

E. Deionizer.

A deionizing column was inserted to remove silver ions, since the level was in excess of the permissible 50 ppb. Apparently no other means was considered for silver removal. The disadvantages of de-ionized water were considered to be outweighed by the need for a potable water.

F. Silver Bromide Column.

It was recognized that the de-ionized water (with near 0 silver content) was susceptible to further biological contamination prior to use. Therefore, it was considered necessary to add additional silver—within the 50 ppb limit—to the water as a final process stage. A temperature gradient chart was provided that indicated the silver bromide crystals would release in the 50 ppb range when the water was at normal room temperatures. However, when water temperature increases, silver ions are released at an increasing rate. Insofar as the Chemtric report is concerned, the temperature effect was related solely to water temperature.

In summary, the report deals with a specific situation, and inserts units into a system to deal with a specific condition. At no time is the broad problem of natural water considered.

The third NASA reference is entitled "Advanced Prototype Silver Ion Water Bactericide System. Contract NAS 9-13718, Final Report 3104, Dec. 1974, Chemtric, Inc." The report deals with a greatly modified system designed to treat water produced by the fuel cell selected for the Orbiter Program.

The water quality of the selected fuel cell's output is considerably improved over the "worstcase" reported on in Report No. 3097. Therefore, the system consists of a single outer container with a small inner container. The active function of the unit is twofold:

A. A "roughing" or prefilter designed to remove all particulate matter and organisms in excess of 0.35 microns, and 98% of particulates as small as 0.15 microns.

B. A mixed column of Activated Carbon (80%) and Silver Bromide granules (20%) designed to adsorb small quantities of organics, and to release between 40 and 85 "ppb" of silver ions to the filtrate.

The report includes a repeat of the water temperature-silver ion release phenomenon. The solution selected is to insert a heat exchanger between the fuel cell collection tank and the purification unit. In other words, to control the water temperature as a control over silver emission.

No new data was presented in the report.

In none of the above identified patents or reports is the problem of chlorides in water inhibiting the ability of a silver salt adsorbed and impregnated on activated carbon to release silver ions.

The prior art of natural water treatment methods and apparatus fails to provide for the fact that chlorides in natural water will combine with silver ions to form either a silver chloride precipitate which does not appear to be as effective as a biocide as silver ions, or the chlorides limit the solubility of silver ions from silver salts and metallic silver impregnated and adsorbed on an activated carbon media. Further, the prior art teaching has been to alter the silver-activated charcoal media to achieve the desired silver release for biocidal purposes, whereas, according to this invention, the water is altered to allow the silver-activated charcoal media to achieve its designed objective.

The treatment of water by oxidizing disinfectants such as chlorine is well known. However, it has recently been shown that the action of chlorine on organic materials in water will produce halogenated organics with suspected carcinogenic properties. These organics include the trihalomethanes such as chloroform and bromoform. Efforts to reduce the formation of halogenated organics in water have included changing the point of chlorination in the water treatment process or replacing chlorine by another disinfectant such as ozone. As a stronger oxidizing agent than chlorine, ozone can oxidize halide ions to the halogen form resulting in the formation of halogenated organics. Other oxidizing agents used in the practice of this invention also product halogenated such as trihalomethanes. To avoid the production of halogenated organics from an oxidizing disinfectant, the halide ions are removed from the water in a initial treatment station. If the halides are replaced by another anion, i.e., bicarbonate, the original ionic concentration of the water is maintained, thereby essentially maintaining the natural character of the water, a natural buffer is added to the water and the bicarbonate will not be affected by any known oxidizing disinfecting agent. Thus, it is shown that halide removal is required before disinfection with silver to avoid precipitation of silver halides and also before disinfection with strong oxidizing agents to prevent formation of halogenated organics.

DESCRIPTION OF THE INVENTION

The invention will be described in terms of the application of silver ions as the disinfectant, but it will be understood that other disinfectants may be employed. Referring to the drawings and more particularly FIG. 1, a through f, which schematically illustrates a process to produce a biologically safe drinking water from a source of natural water at ambient temperature, i.e., water which is intended for drinking purposes such as tap water, whether the tap is connected to a domestic or commercial well or private or municipal household water source, as well as surface waters contained in lakes or streams. It will be understood that natural water excludes distilled and deionized water, raw sewage and/or industrial waste water or process waste water and salt waters.

Figure 1:
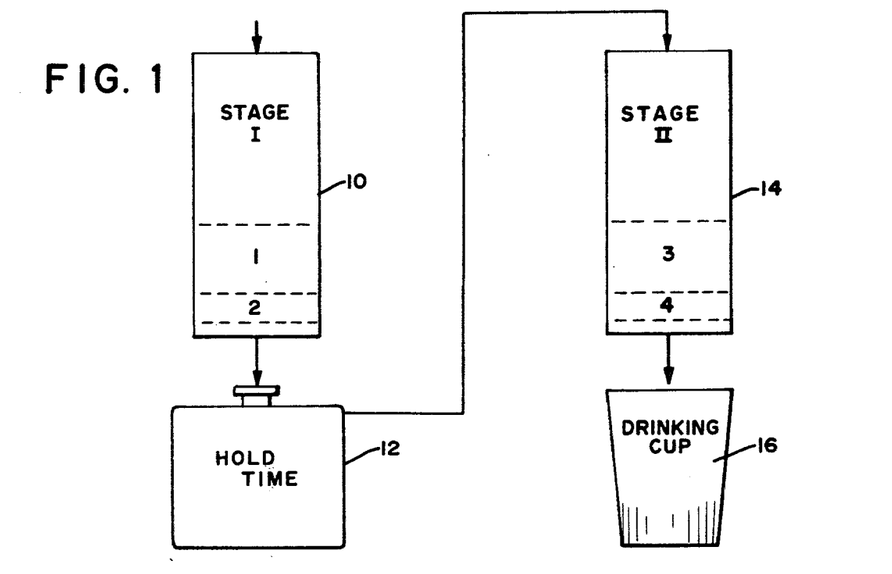
FIGS. 1a through 1f is a schematic representation of the process according to our invention.
Figure 1A:
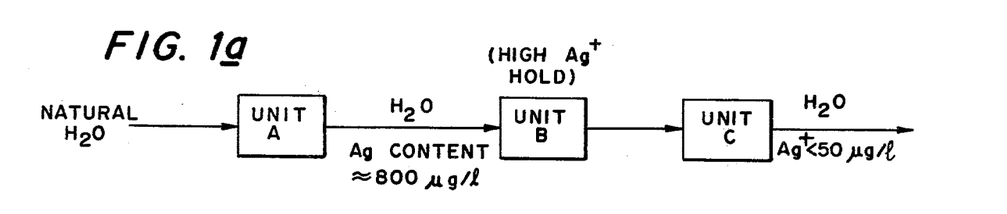

In FIG. 1a the natural water is fed to a treatment station of Unit A. In Unit A metallic ions, such as silver ions ($Ag^+$), are introduced to the input water at high levels compared to the fifty micrograms per liter level allowed for silver by the Environmental Protection Agency Standard for Drinking Water. The content of $Ag^+$ found to be effective is on the order of 600 to 1000 $\mu g/l$ more or less. The high $Ag^+$ water from Unit A is held for a period of time on the order of six minutes for water having a bacterial level of $E\ coli$ up to ten thousand Colony Forming Units (CFU) per 100 milliliters (ml). Laboratory tests have shown the need for high silver levels for rapid kill of $E\ coli$. Such tests were conducted in connection with the development of this invention.

After the water containing the 600 to 1000 $\mu g/l$ silver ions is held in Unit B, it is then treated in Unit C to reduce the silver ion content to an acceptable level. By "acceptable" is meant that the treated water meets the metallic ion limit currently established by a regulatory body, such as the United States Environmental Protection Agency (50 $\mu g/l$ for silver at the present time) and/or meets consumer acceptance, for instance, as to taste. Where mercury is used in place of silver, mercury ions are introduced in Unit A in the order of 400–600 $\mu g/l$ and the water is thereafter treated in Unit C to reduce the mercury ion level to 2 $\mu g/l$ or less to meet the legal standard.

While the process of FIG. 1a illustrates a process for treating natural water, it provides undesirable opportunity for the oxidation of halide ions to halogen and subsequent oxidation of organic materials to haloorganics. The following processes avoid these undesirable features.

Figure 1B:
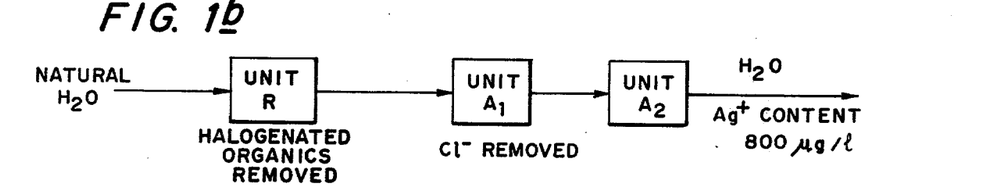

FIG. 1b schematically illustrates a modification of the process according to FIG. 1a. In FIG. 1b the natural water is first treated in unit R to remove halogenated organics that may have been formed in municipal treatment plants with the use of oxidizing biocides, i.e., chlorine. Unit R may be a bed of activated carbon or other satisfactory adsorbent material. Preferably, unit R is self-sanitizing.

If the water has not been pretreated in a municipal plant, unit R may be omitted and the water admitted directly to two treatment stations, or Units $A_1$ and $A_2$. Unit $A_1$ eliminates or significantly reduces the halide ions ($X^-$) in the input water, the reduction of which allows sufficient dissolution of the metallic ions, such as silver ions, which are introduced in Unit $A_2$ for the same purpose described above in connection with the description of FIG. 1a. While not illustrated in FIG. 1b, it should be understood that the effluent from Unit $A_2$ is further treated in Unit B and Unit C as described above. The modified process according to FIG. 1b is to produce a partial water treatment in which a high level of metallic ions, such as silver ions, is imparted to the raw water input.

Figure 1C:
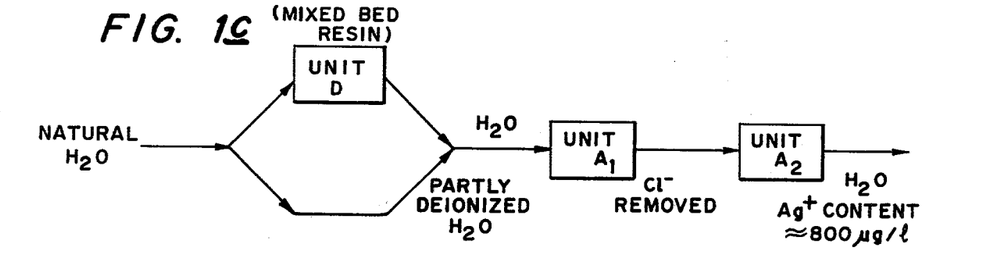

In FIG. 1c the process according to our invention is modified to process input water with a high mineral content in a mixed bed resin Unit D to partly deionize the input water prior to treatment in Units $A_1$ and $A_2$, FIG. 1b. A part of the input water bypasses the mixed bed resin Unit D to preserve the natural minerals present in the input water which are desirable for taste and health reasons. The water effluent from Unit D is totally deionized.

Figure 1D:
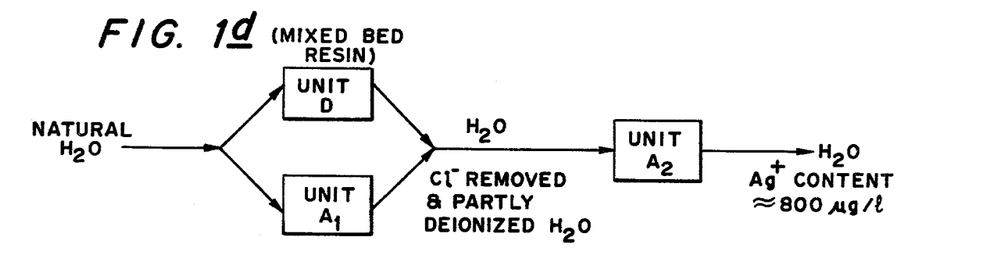

Alternatively, as shown in FIG. 1d where the input water has a high mineral content, our process is modified to completely deionize a portion of the input water in Unit D, and the remaining input water is treated to remove halides, sulfates and nitrates, i.e., selective removal of anions. The combined effluent from Unit $A_1$ and Unit D is then passed through Unit $A_2$ containing a media of activated carbon impregnated with silver salts and metallic silver. Unit $A_1$, FIG. 1d is identical to Unit $A_1$, FIG. 1b.

Figure 1E:
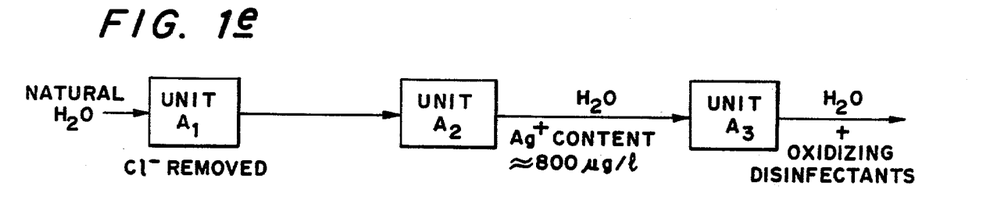

FIG. 1e schematically illustrates a modification of the process according to FIG. 1b. In FIG. 1b Units $A_1$ and $A_2$, the functions of which are described above in connection with the description of FIG. 1b, are followed by a third treatment station Unit $A_3$. In Unit $A_3$ oxidizing agent disinfectants are introduced following the elimination of halide ions in Unit $A_1$. This absence of halide ions prevents any oxidation to the halogen form and subsequent oxidation to carcinogenic halogenated organics. This embodiment of the invention contemplates the use of oxidizing agents for bacterial kill without the problem of halide ion oxidation. Among the oxidizing agents that can be safely used in this embodiment are ozone ($O_3$), permanganate ($MnO_4^-$), peroxide ($H_2O_2$), ferrate ($FeO_4^=$), persulfate ($S_2O_8^=$), and argentic ($Ag^{++}$). The practice of this invention also permits the use of the above mentioned oxidizing disinfectants without an initial discharge of silver ions as discussed in connection with the description of Unit $A_2$ in FIG. 1b. While not illustrated in FIG. 1e, it is to be understood that under these circumstances Unit $A_2$, FIG. 1e would be eliminated or modified to perform substantially the same function as that of Unit $A_3$, FIG. 1e.

Figure 1F:
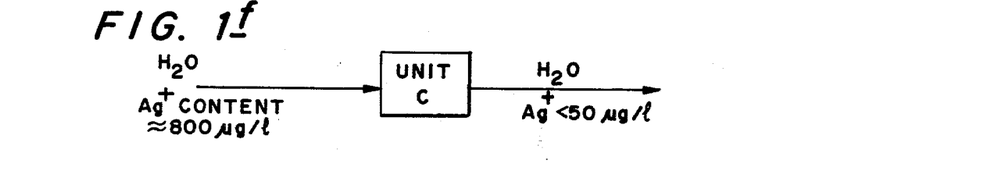

FIG. 1f illustrates a further step in the process of FIG. 1 whereby water containing a high silver ion level is treated to lower the silver ion level to 50 $\mu$g/l or less. Unit C of FIG. 1f is identical to Unit C in FIG. 1a.

Figure 2:
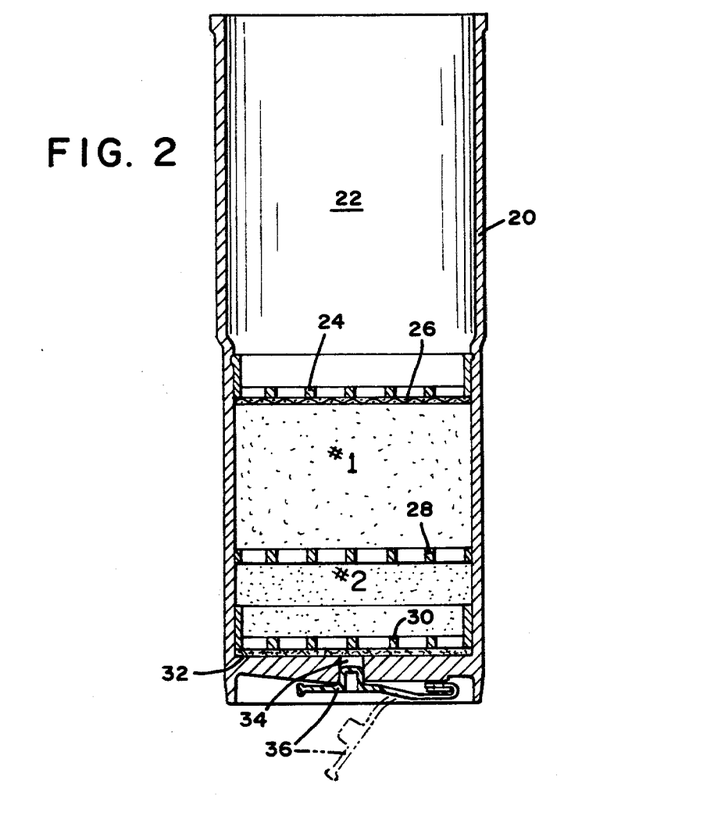
FIG. 2 is a diagrammatic elevation of one embodiment of a water treatment unit for carrying out the process according to FIGS. 1a to 1f.

Referring particularly to FIG. 2, reference character 10 designates an open top container in which the first stage of the process is carried out. Located in zone No. 1 of the container is an ion exchange resin bed for removing halide ions from the water to be treated. A suitable material for this purpose is an ion exchange resin bed in which halide ions are removed from the input water without significantly changing the pH and anion content of the water. A method of achieving this halide ion removal is by the use of an anion exchange resin in the bicarbonate form. An anion exchange resin in the bicarbonate form will exchange with all anions ($SO_4^=$, $NO_3^-$, $Br^-$, $Cl^-$) until equilibrium is established between the concentrations of all anions ($SO_4^=$, $NO_3^-$, $Br^-$, $Cl^-$, $HCO_3^-$) associated with the resins' functional groups and their concentrations in the input water.

The efficacy and capacity of a given resin for halogen ($X^-$) removal to the desired $X^-$ concentration will be determined by the exchange equilibrium constants, kinetics of exchange, flow rate through the resin bed, input ion concentrations, temperature, etc. A resin suitable for this purpose is Rohm & Haas IRA 410.

As an additional feature of this invention, the anion exchange resin for the removal of halide ions also accomplishes the partial removal of organics which in the presence of halogen would ultimately oxidize to form trihalomethanes. Thus, it is shown that the formation of halogenated organics can be avoided by the simultaneous removal of halides and precursor organics in the treated water. Another feature of the anion exchange resin is the removal of minor and/or trace anions in water, such as phosphate and carbonate, which can interfere with disinfectants such as silver.

In zone 2 of stage I (FIG. 2) is a bed consisting of a composition of silver salt(s) adsorbed and/or impregnated on activated charcoal. Any silver salt or combination of silver salts whose solubility product is such that the resulting silver ion concentration in the water is in excess of 50 micrograms of silver per liter may be used. The silver salts are present in the amount approximately equal to 1% by weight of the activated charcoal. Other suitable media for the release of silver ions in zone 2 include alumina, silica gel and diatomaceous earth.

If oxidizing disinfectants are to be added in sequence with the discharge of silver ions, stage I would include a third treatment station, zone 2A, which would accommodate to addition of said oxidizing disinfectants. However, if said oxidizing disinfectants are to be introduced in place of silver ions, zone 2 of stage I (FIG. 2) would be modified to provide means for the solution fed chemical addition of said disinfectants. Oxidizing disinfectants may be added before, after or with silver ions, whatever is found most advantageous.

Reference character 12 designates a container which is placed beneath container 10 for the purpose of collecting and storing water which has passed through stage I.

A container 14 is provided, which structurally may be the same as container 10. In container 14, above zone 3, is an open space for receiving water from container 12. The water from container 12 passes through zone 3 for the removal of objectionable organics and the partial removal of oxidizing disinfectants introduced in zone 2 or zone 2A. The residual oxidizing disinfectants are removed in zone 4. Zone 3 may be a bed of plain activated charcoal such as Calgon "Filtersorb 200" or "Filtersorb 400", but preferably consists of a self-sanitizing activated charcoal media. A self-sanitized activated charcoal bed or media may be a composition of activated charcoal having silter salt(s) adsorbed or impregnated on the charcoal. The following treatment zone, zone 4, contains an ion exchange resin bed for selective removal of the silver ions to a concentration below 50 micrograms per liter from a silver ion concentration provided by zone 2 of stage I, i.e., in excess of 800 micrograms per liter. As noted above, zone 4 also accomplishes the removal of residual oxidizing disinfectants in order to maintain the natural character of the water.

One method of achieving this silver ion removal is by the use of an anion exchange resin in the chloride form. It is believed that the silver combines with this resin in such a way as the silver concentration in the effluent appears to be governed by the solubility product of silver chloride. Other anionic forms whose solubility product with silver is sufficiently small as to lower the concentration of silver in the treated water to less than 50 $\mu g/l$ may also be used to remove silver. Although not widely known, the anion exchange resin may also remove silver by chelation. (I. M. Abrams, N.A.C.E. Meeting—Houston, Texas, Oct. 8, 1974—Selective Removal of Heavy Metals from Wash Waters by Ion Exchange and Adsorbent Resins.)

Cation exchange resins may also be used to selectively remove silver. With both types of resins, its form must be such as to not adversely alter the treated water. Although it may adversely alter the water, deionization by ion exchange is also a possible method for silver removal.

A suitable ion exchange resin for removing silver ions from water is Rohm & Haas "Amberlite IRA 410" consisting of styrene DVB in chloride form. A self-sanitized media subsequent to the silver removal resin would require a silver salt(s) which releases residual silver ions to water passing therethrough at less than 50 $\mu g/l$.

Stage II may also be arranged inversely to that described above. That is, zone 3 may contain the ion exchange resin for silver ion removal and zone 4 may contain the self-sanitizing activated charcoal.

In operation, a quantity of raw water, such as a glassful, is poured into the open top of container 10, which has sufficient space above zone I to accommodate this quantity. As the water percolates by gravity through zone I, an ion exchange takes place which removes halide ions and adds bicarbonate ions to the water and thus retains the natural character of the water. The water thus treated then passes through the activated chacoal impregnated with oligodynamic silver in zone 2. Here, the activated charcoal adsorbs organic materials which may be present in the water and the silver imparts silver ions to the water, which acts as a bactericide and a virucide. The concentration of silver ions produced in the water in zone 2 is 600 to 1000 micrograms per liter ($\mu g/l$), which is substantially greater than the allowable EPA Standard for Drinking Water (50 micrograms per liter). At this concentration the silver ions act very rapidly to kill bacteria and also appear to inactivate some viruses in the water, but the virus inactivation rate is slower than the bacteria kill rate.

If an oxidizing disinfectant such as permanganate ($MnO_4^-$) is to be introduced in place of silver ions, a solution fed chemical addition takes place in zone 2. If a sequential addition is utilized, the water with a silver ion concentration of 600 to 1000 micrograms per liter ($\mu g/l$) first passes to zone 2A where an oxidizing disinfectant is introduced in solution.

After passing through zone 2, the water is collected in container 12 where it is held for a period of time, six minutes or more, and is then poured into container 14, In passing by gravity flow through the bed of zone 3, an ion exchange takes place which removes silver ions from the water so as to bring the concentration thereof below the allowable value of 50 $\mu g/l$ and partially removes oxidizing agent disinfectants introduced in zone 2 or zone 2A.

The water then passes through a final bed of self-sanitized activated charcoal in zone 4 for further adsorption of residual oxidizing disinfectants and organic material which may not have been adsorbed in zone 2.

Alternatively, the bed of zone 3 may contain the self-sanitized activated charcoal for adsorption of organic matter. The water subsequently passes through an ion exchange resin in zone 4 for removing silver ions to a level below 50 micrograms per liter (ug/l). Each embodiment of this invention accomplishes the removal of solution fed oxidizing disinfectants, thereby maintaining the natural character of the treated water.

Figure 3:
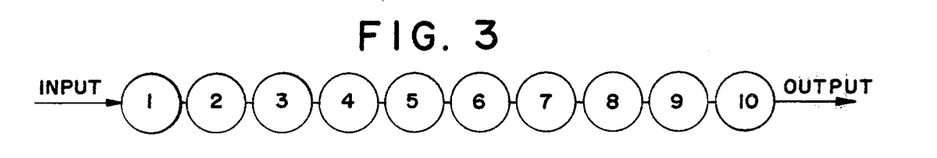
FIG. 3 is a cross-sectional view of the unit 10 shown in FIG. 2.

In FIG. 3 there is shown an actual container 20, which corresponds to container 10 in FIG. 2. As shown, it is an upper compartment 22 having an open top. At the bottom of compartment 22 is a grating 24 over a screen 26 forming the top of zone I. Below this screen and above a grating 28 is the bed of ion exchange resin for removing halides, as described above in connection with FIG. 2. Between grating 28 and a lower grating 30 is zone 2, which contains the bed of silver impregnated carbon. A section 32 underlies grating 30 and is over an outlet opening 34 which may be provided with a normally closed manually operable valve 36.

Although it is not shown in FIG. 3, it should be understood that where a sequential addition of oxidizing disinfectants is utilized, a third grating would be inserted below grating 30, thereby creating a third treatment station for the introduction of said oxidizing disinfectants. In this case, screen 32 would be placed below the third grating in between such grating and said outlet opening 34.

An actual container corresponding to container 14 of FIG. 2 would be constructed identically with container 20 of FIG. 3 but, of course, would have the beds in zones 3 and 4 as described in connection with FIG. 2.

Figure 4:
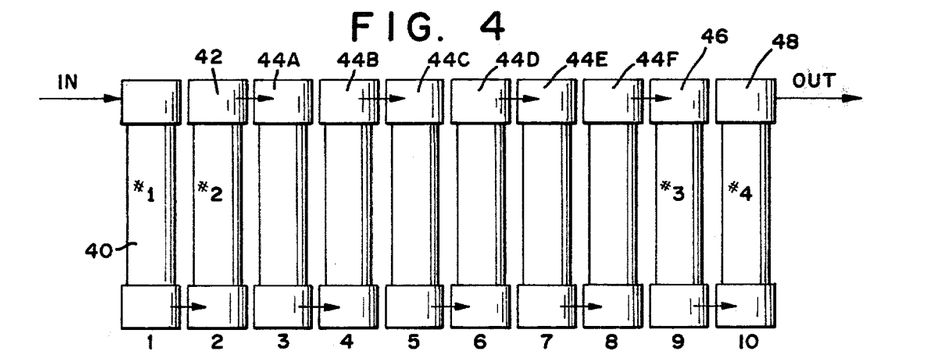
FIG. 4 is a top view of a schematic illustration of a second embodiment of apparatus for carrying out the process according to our invention.
Figure 5:
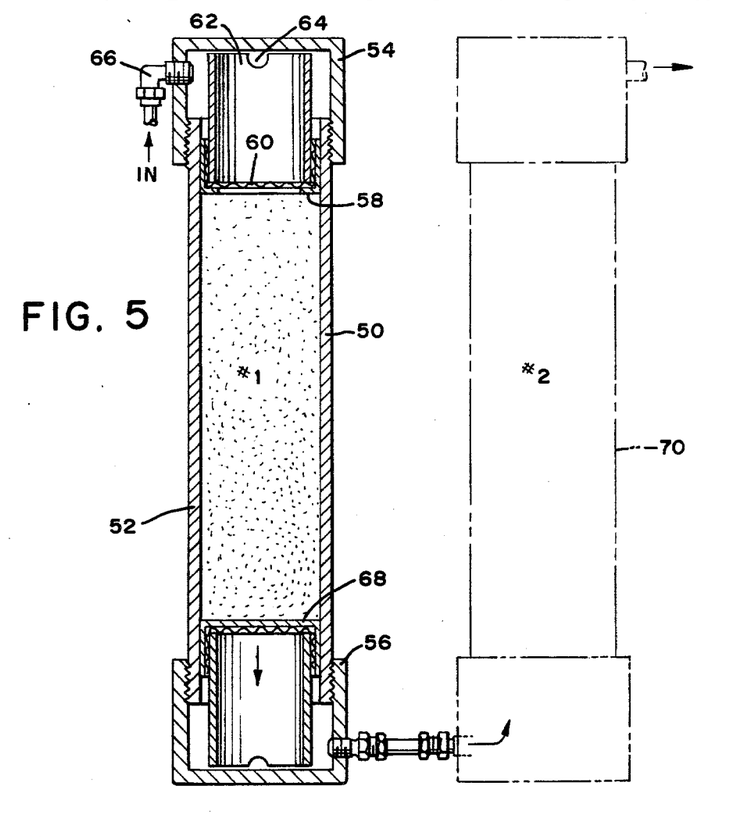
FIG. 5 is a schematic side elevation of the apparatus according to FIG. 4.

The apparatus diagrammatically shown in FIGS. 4 and 5 is intended for the continuous flow of water to be treated. Container 40 corresponds to zone I in container 10 (FIG. 2), into which water is admitted under pressure at the top. After flowing through the ion exchange bed in tank 40, the water passes out the bottom and into the lower end of container 42 which corresponds to zone 2. From here the water passes through a series of containers 44A–44F, which correspond to the collecting container 12 of FIG. 2, but of relatively greater capacity in order to provide sufficient time for the silver ions and/or oxidizing disinfectants to act on the flowing water within the containers.

From container 44F the water passes into the top of a container 46 which corresponds to zone 3 in FIG. 2. After passing through the ion exchange bed in container 46, where excess silver ions are removed, the water flows into the bottom of a container 48, corresponding to zone 4 of FIG. 2, which contains the self-sanitized activated charcoal bed. From this last container the water passes out, either to be used directly or to be stored.

As described above, the containers 46 and 48 may be transposed, whereby the water passes through an ion exchange resin to remove the silver ions and subsequently passes through a self-sanitized activated charcoal bed as described in more detail above in connection with FIG. 2.

Figure 6:
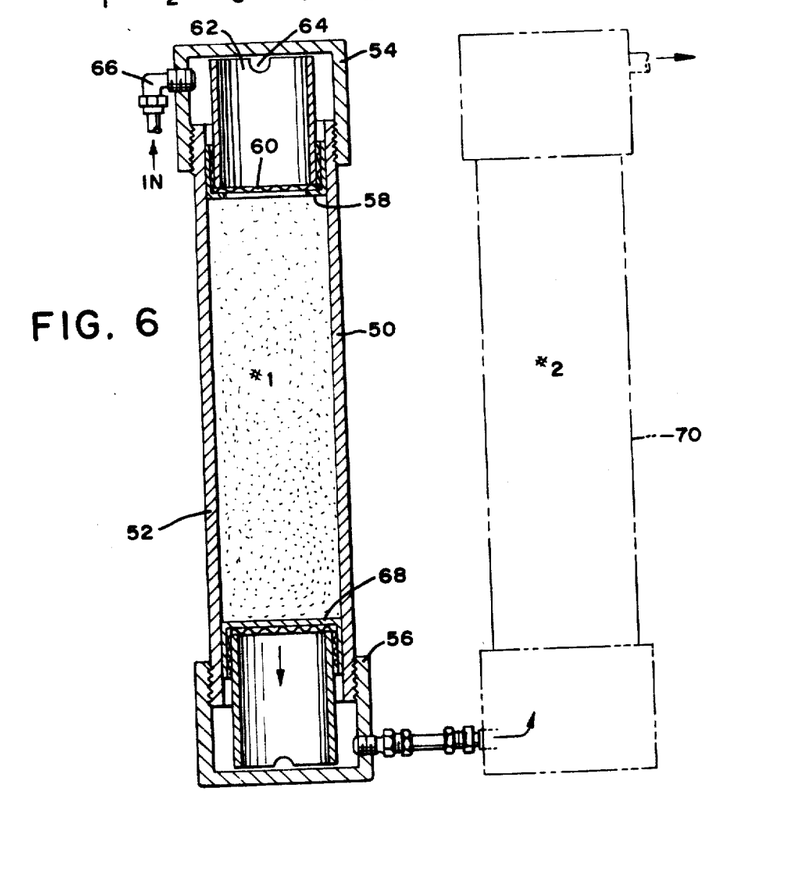
FIG. 6 is a cross-sectional view of the number one unit shown in FIGS. 5 and 6.

In FIG. 6 there is shown in cross section an actual container 50 which corresponds to any of the containers 40, 42, 46 and 48 of FIG. 5. It consists of a cylinder 52 threaded at opposite ends to which threaded caps 54 and 56 may be removably secured. At the upper inlet end, a cup-shaped felt packing 58 and a similarly shaped screen 60 are pressed against the interior of cylinder 52 by a tube 62 formed with notches 64 to permit the flow of water from an inlet fitting 66 in the cap 54. The construction at the bottom is similar, except the felt packing 68 is not formed with a central opening and also serves as a filter. As shown in FIG. 6, the bottom of container 50 is connected to the bottom of a similar container 70, which corresponds to container 42 in FIGS. 5 and 6. As stated above, the construction of the containers corresponding to 46 and 48 in FIGS. 4 and 5 are the same as that of container 50 in FIG. 6. The actual containers corresponding to 44A through 44F in FIGS. 5 and 6 are simply hollow tanks. In order to obtain a holding time of at least six minutes, the combined volume of tanks 44A through 44F should be 3 gallons if the flow rate is ½ gallon per minute.

Laboratory tests appear to establish virus inactivation by silver at the concentrations according to this invention of type 1, Polio Virus and Echo Virus, type 7. The same laboratory tests have established the efficacy of silver as a bactericide for *E coli, Salmonella typhimurium, Shigella sonnei, Candida albicans* and *Pseudomonas aeruginosa*. Airborne bacteria which have contaminated water, such as *Streptococcus Beta* Haemolyticus and *Staphylococcus aureus*, appear to be killed by silver at the concentrations according to the invention. However, for the airborne bacteria noted above, a twelve to twenty-minute holding time is required as opposed to six minutes holding time for the first noted bacteria.

The holding time required for the operation of silver ions and/or oxidizing disinfectants as bactericides will differ from that required for virus inactivation. Thus, the holding time for virus inactivation may be determined by suitable tests which are known to the art.

While we have described the method of treating drinking water and a more or less specific embodiment of apparatus according to our invention, it is to be understood that this has been done for purposes of illustration without intending to limit the scope of the invention which is to be determined from the appended claims.

We claim:

1. A method of producing biologically safe drinking water from natural water comprising the steps of removing halide ions from said natural water and exchanging for said halide ions an anion which will substantially maintain the original ionic character of said natural water and not inhibit the biocidal effects of bactericides, and introducing a bactericide to said water in a biologically acceptable amount to kill bacteria in said water.

2. The method according to claim 1, in which the step of introducing the bacteria includes the use of an amount to rapidly kill the bacteria, followed by reducing said bactericide to a biologically acceptable amount after it has acted as a bactericide.

3. The method according to claim 1 wherein said bactericide is a metallic ion.

4. The method according to claim 1 wherein said bactericide is an oxidizing agent.

5. A method according to claim 1 wherein one portion of said natural water is deionized while the other portion thereof is not so treated and both the deionized and untreated portions are combined before halide ion removal.

6. The method according to claim 1 wherein one portion of said natural water is deionized while the other portion of said water has the halide ions removed therefrom and both said portions are brought together prior to introducing the disinfectant thereto.

7. The method according to claim 1 wherein said bactericide is selected from the group consisting of silver ions, ozone, permanganate, peroxide, mercury, ferrate, persulfate and argentic.

8. A method according to claim 7 comprising the steps of introducing as a bactericide mercury ions substantially in excess of 2 micrograms per liter, holding the treated water containing said mercury ions for a period of time sufficient for said mercury ions to act as a bactericide, and thereafter reducing the mercury ions in said water to not more than 2 micrograms per liter.

9. A method for producing biologically safe drinking water from natural water comprising the steps of removing the halide ions from said natural water and exchanging for said halide ions an anion which substantially maintains the ionic character of said water, introducing silver ions substantially in excess of 50 micrograms per liter to the resulting water, holding the water containing said silver ions for a period of time sufficient for said silver ions to act as a bactericide, and thereafter reducing the silver ions in said water to not more than 50 micrograms per liter.

10. The method according to claim 9 wherein the step of reducing the silver ions is accomplished by contacting the water with an anion exchange resin regenerated with an anion that forms a silver salt of low solubility and which is associated with the anion exchange resin.

11. The method according to claim 10 wherein the anion resin is in the chloride form.

12. The method according to claim 11 wherein said resin for removing halide ions and said resin for removing silver ions are sanitized by a silver wash while being regenerated in the bicarbonate and chloride form respectively.

13. A method according to claim 9 wherein said silver ions are introduced into said resulting water by passing the water through a medium containing a silver salt whose solubility product provides a silver ion concentration in excess of 50 micrograms per liter.

14. A method according to claim 13 wherein said medium is selected from the group consisting of activated charcoal, alumina, silica gel and diatomaceous earth.

15. The method according to claim 9 wherein said halide ions are removed by passing said water through a bed of halide ion removing anionic resin.

16. The method according to claim 15 wherein said anionic resin is regenerated in the bicarbonate form and imparts bicarbonate ion to said treated water to retain the natural character of the treated water.

17. A method for producing biologically safe drinking water from natural water comprising the steps of removing the halide ions from said natural water and exchanging for said halide ions an anion which substantially maintains the ionic character of said water, introducing silver ions substantially in excess of 50 micrograms per liter, introducing an oxidizing disinfectant or combination of such disinfectants, holding the treated water for a period of time sufficient for bactericidal effect, and thereafter reducing the silver ions in said water to not more than 50 micrograms per liter and removing said oxidizing disinfectants.

18. A method of producing biologically safe drinking water from natural water comprising the steps of removing halide ions from said natural water and exchanging for said halide ions an ion which will substantially maintain the original ionic character of said natural water and not form halogenated organics with oxidizing bactericides nor inhibit the biocidal effects of said oxidizing bactericides and introducing an oxidizing bactericide to said water in a biologically acceptable amount to kill bacteria in said water.

19. The method according to claim 18, in which the step of introducing said bactericide includes the use of an amount to rapidly kill the bacteria, followed by reducing said bactericide to a biologically acceptable level after it has acted as a bactericide.

20. The method according to claim 18 wherein said ion exchanged for said halide ions is an anionic bicarbonate ion.

* * * * *

UNITED STATES PATENT AND TRADEMARK OFFICE
CERTIFICATE OF CORRECTION

PATENT NO. : 4,198,296

DATED : April 15, 1980

INVENTOR(S) : John J. Doumas, et al

It is certified that error appears in the above—identified patent and that said Letters Patent is hereby corrected as shown below:

The 3 sheets of drawings should be deleted to insert the attached sheets 1 thru 3 respectively therefor.

Signed and Sealed this

Nineteenth Day of August 1980

[SEAL]

Attest:

SIDNEY A. DIAMOND

Attesting Officer     Commissioner of Patents and Trademarks